Oct. 31, 1933.   C. C. NEALE   1,933,277
EVEN BALANCE SCALE
Filed Feb. 4, 1932

Charles C. Neale INVENTOR
BY W. M. Wilson
ATTORNEY

Patented Oct. 31, 1933

1,933,277

UNITED STATES PATENT OFFICE 1,933,277

EVEN BALANCE SCALE

Charles C. Neale, Dayton, Ohio, assignor, by mesne assignments, to International Business Machines Corporation, New York, N. Y., a corporation of New York Application February 4, 1932. Serial No. 590,836

3 Claims. (Cl. 265—58)

This case relates to weighing scales particularly of the even balance type.

The principal object of the invention is to provide a novel balance indicating device.

Further and other objects and advantages will be hereinafter set forth in the accompanying specification and claims, and shown in the drawing, which by way of illustration show what is now considered to be the preferred embodiment of the invention.

Figure 1:
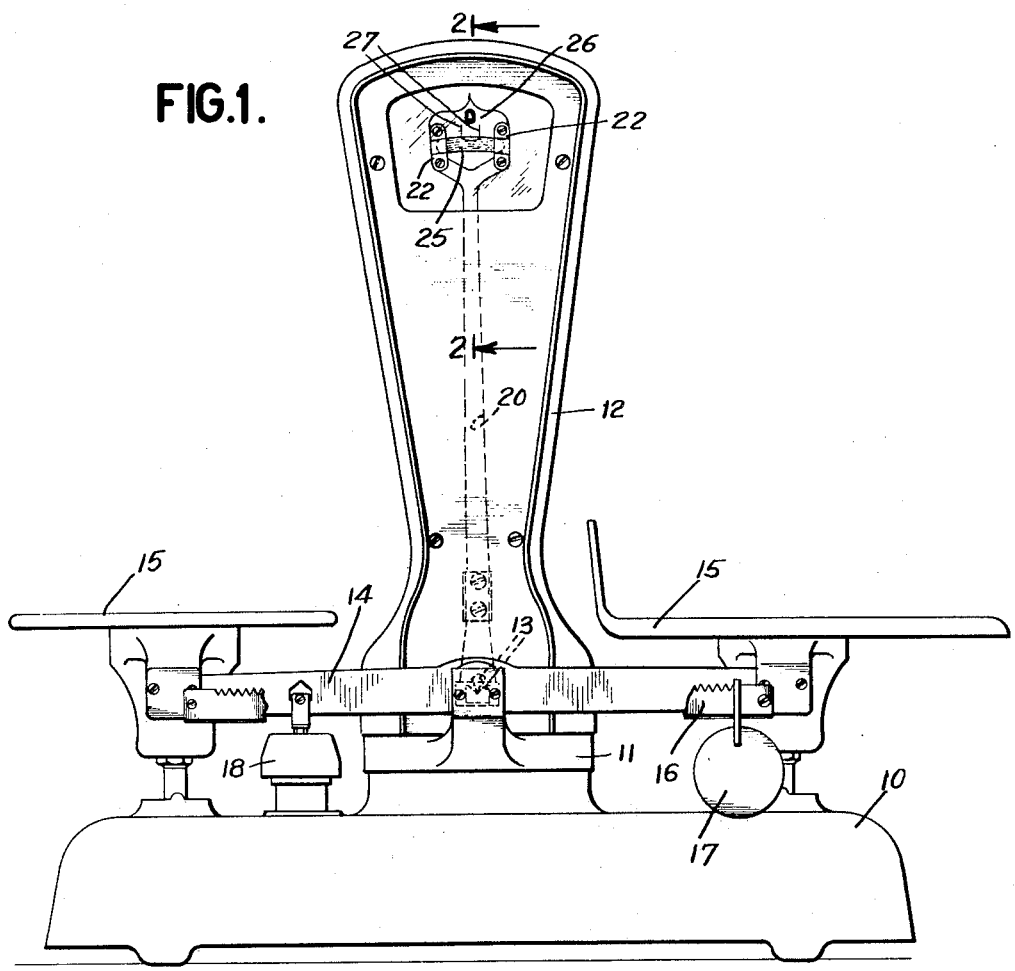
Fig. 1 is a front view of the scale.
Figure 2:
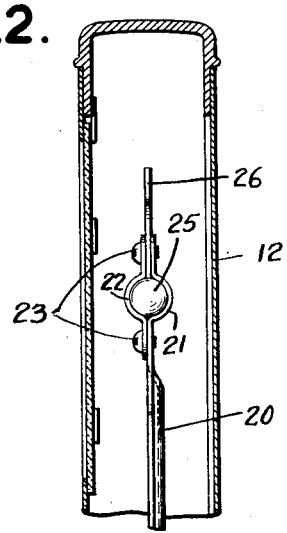
Fig. 2 is a section on line 2—2 of Fig. 1.

Referring to the drawing in detail, the scale has a base 10 on which is mounted the vertical frame 11 and the chart housing 12. Fulcrumed by knife edge bearings 13 on the frame 11 is the even balance beam 14 carrying load receiving pans 15 at opposite ends. The beam 14 also is provided with the usual tare bar 16 and weight 17 and is connected with the dash pot 18.

Secured to the beam directly above the fulcrum thereof is an indicator hand or pointer 20 of appreciable length. At its upper end, hand 20 is formed with a semi-circular grooved portion 21. A complementary grooved piece 22 is fixed to the hand by screws 23. Between portions 21 and 22 is retained a spirit level 25 and a chart 26 above the level, the chart bearing the indication "O" located between tolerance lines 27. When the air bubble in the spirit level is between lines 27, then the scale beam is in balance.

The accuracy of the reading is not affected by the scale being out of level since both elements of the indicating means; namely, the chart 26 and level 25 are fixed to the indicator hand 20 and will remain stationary therewith whereas if the chart were fixed to the housing, it would incline with the housing while the level remained stationary.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. In a scale, a rockingly mounted beam and registering means therefor comprising a vertically disposed elongated support movable with the beam, and a spirit level indicator, the support being provided at its upper end with means for removably holding the spirit level.

2. In a scale, a rockingly mounted beam, a housing, a support movable with the beam and disposed within the housing, and a chart and spirit level clamped to the upper end of the support for indicating balance of the beam.

3. In a scale of the even balance type, a beam pivoted intermediate its ends, a load support connected to one end of the beam, means connected to the opposite end of the beam whereby counterbalancing means for the load may be applied, a vertically disposed elongated support connected to the beam to move in response to movement of the beam, and an indicator carried by the upper end of the support and comprising a spirit level and an index coacting with the level to indicate when the beam is in balance under the opposing forces of the load and the counterbalancing means.

CHARLES C. NEALE.